UNITED STATES PATENT OFFICE.

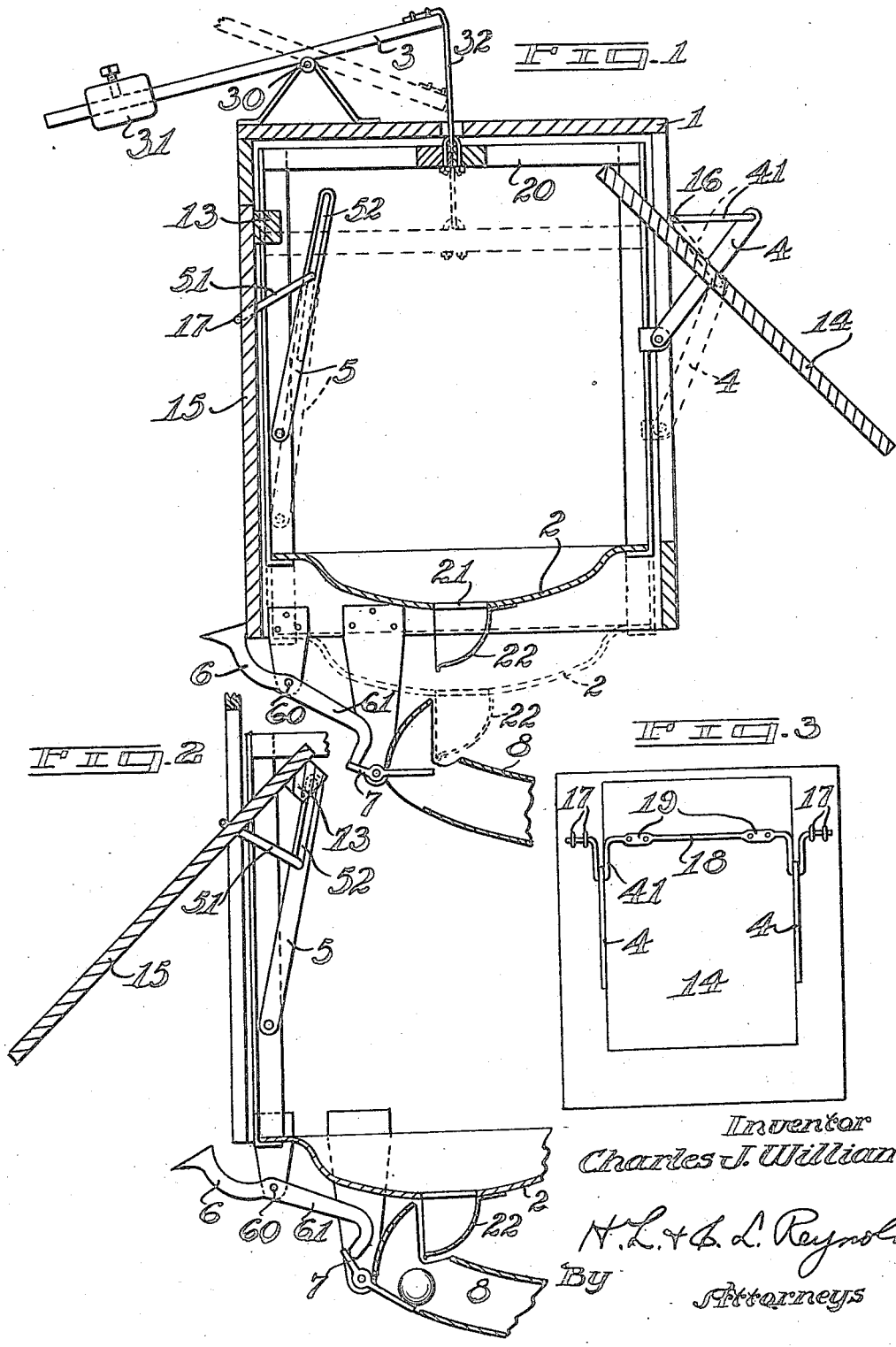

CHARLES J. WILLIAMS, OF SEATTLE, WASHINGTON.

TRAP NEST.

1,419,340.  Specification of Letters Patent.  Patented June 13, 1922.

Application filed October 5, 1920. Serial No. 414,740.

*To all whom it may concern:*

Be it known that I, CHARLES J. WILLIAMS, a citizen of the United States of America, and resident of the city of Seattle, in the county of King and State of Washington, have invented certain new and useful Improvements in Trap Nests, of which the following is a specification.

My invention relates to trap nests of the kind which are provided with two doors, an entrance and an exit door, the entrance door being closed by the entrance of the hen into the nest and the exit door being opened upon the deposit of an egg.

It is an object of my invention to improve upon trap nests of the class described to make them simpler in construction and in operation, and to do away with superfluous parts which easily become out of order. It is my object to eliminate highly sensitive trigger mechanisms which not only fail to give satisfaction in operation, due to natural variations, but which also become easily disarranged and out of order.

It is another object of my invention to provide a trap nest of the kind which has a platform which is depressed by the entrance of the hen, which may be regulated to operate satisfactorily for widely different breeds and weights of hens.

In general my object is the simplification and standardization of trap nests of the kind described.

My invention comprises those novel parts and combinations thereof which are shown in the accompanying drawings, described in the specification, and particularly defined by the claims terminating the same.

In the accompanying drawings I have shown my invention in a form which is now preferred by me.

Figure 1 is a vertical section through a nest showing, in full lines, the nest ready for the reception of a hen, and in dotted lines, the positions assumed by the parts upon entrance of a hen.

Figure 2 is a section through a portion of the nest similar to Figure 1, showing the positions of the parts when an egg has been deposited.

Figure 3 is an elevation of the entrance door and its operating mechanism, shown in closed position.

I provide an outer enclosing casing 1 within which is mounted an elevator frame 20. The frame 20 may be of skeleton construction and it supports a nest platform 2. The frame 20 is supported normally in raised position by means of a lever 3, pivoted at 30 upon the casing, 1, and connected by one end to the frame 20 through a suitable cord 32. At its opposite end the lever 3 has mounted thereon a counter-weight 31 which is adjustable lengthwise of the lever.

Two doors are provided in connection with the casing, one of these consisting of the entrance door 14 and the other the exit door 15, pivoted in the casing 1 at 16 and 17, respectively, below their upper edges. The entrance door 14 is connected to the frame 20 through a link 4 connected to the frame and to the door, or to an extension arm 41 which is rigidly connected to the door. The exit door 15 is similarly connected to the frame 20 through a link 5 connected to the frame and to the door or to an arm 51 rigidly connected to the door. There is, however, a certain amount of lost motion between the link 5 and the extension arm 51 corresponding to the distance the platform 2 is lowered upon the entrance of a hen. This may be provided by securing the extension arm 51 in a slot 52 in the link 5.

As I form the extension arms 41 or 51, these are bent from a metal member or wire which forms a part of a metal member or wire 18. The arms 41 or 51 are bent outward from the wire 18 and the wire is flattened at portions indicated at 19, so that it may be secured to the door to prevent relative movement therebetween. The outer ends of the wire 18 are extended to form the pivots 17.

At the upper end of the exit door 15 I provide a counter-weight 13 upon the inner side of the door, which normally tends to open this exit door. A latch which consists of a lever 6, pivoted at 60 upon a bracket secured to the casing 1 and having an end 61 heavier than its latching end, is positioned to lock the door 15 in closed position. The end 61 of the latch lever 6 rests upon an end of a lever 7. The other end of this lever 7 extends into an egg chute 8 which is positioned beneath the nest in position to be depressed by an egg passing down the chute. A hole 21 is provided in the platform 2 through which the egg when deposited may pass. A curved plate 32 may be positioned below the hole 21 to direct the egg into the chute 8 and also to prevent the hen from reaching down with her foot to trip the lever 7. For this reason the lever 7 is placed to one side of the hole 21 and the chute 8 is deflected so that the egg enters it from the side. This may be readily seen from an inspection of Figure 2, which shows an egg passing down the egg chute.

In use, a series of such nests may be placed in a partition or fence dividing two fields. The flock which is to be checked is placed in the field toward which the entrance doors of the nests face. These doors 14 are open. A hen will pass into a nest and in doing so she will close the door 14 behind her. So long as she remains in the nest the door 14 will remain closed. The connection of the arm 51 with the loop 52 allows the downward movement of the platform 2 without causing movement of the door 15. When an egg has been deposited this is rolled down the chute 8, and in passing the lever 7 this is depressed to unlatch the lever 6. The counter-weight 13 at the upper edge of the door 15 causes this door to swing open when the latch is released and the hen may then walk out of the nest into the field beyond the partition wall.

Upon leaving the nest the platform 2 is drawn upward by the weighted lever 3 and this causes the door 15 to close, the arm 51 being now at the bottom of the slot 52, until the door is latched. The same motion of the platform 2 causes the door 14 to open, the frame 20 and the door 14 being directly connected. The nest is now ready for the reception of a second hen and the egg has been rolled down the chute to a convenient collecting point.

If it is desired to trap nest a heavy breed of hens, such as Wyandottes, one day, and a lighter breed such as Leghorns the next day, the traps may be very quickly adjusted to provide for this by shifting the weight 31 upon the lever 3. There may be a scale marked upon the lever 3 if desired, which indicates the position of the weight 31 for the average weights of the various breeds of hens.

By the use of this device it is possible to ascertain from day to day just what hens are laying. Those who do not, during the day, pass from one side of the partition wall to the other, are the non-layers for that day. Those who enter the nest and do not lay are kept in the nest until released and thus they may be detected. It is impossible, with such a device, for a hen to pass through the nest without laying. The mechanism of the nest is very simple and is not likely to get out of order. The nest, as explained above, is adjustable for various weights of hens.

What I claim as my invention is:

1. In a trap nest, in combination, an outer casing having entrance and exit openings, a yielding nest platform therein having an egg aperture, an entrance door connected with said platform to be closed by the lowering thereof, an exit door connected to said platform and independent of the entrance door, the exit opening being unobstructed beneath said exit door, the exit door being hinged upon said casing and normally tending to remain open when said platform is lowered, a latch operable to hold the exit door in closed position, an egg chute below the egg aperture, and latch-releasing means projecting into said egg chute to be operated by an egg when deposited.

2. In a trap nest, in combination, a nest platform having an egg aperture therein, and bodily movable vertically, an entrance door connected thereto to be closed by the lowering of said platform, an exit door operatively connected to said platform, and independent of the entrance door, said exit door being hinged upon a horizontal axis and normally tending to remain open when said platform is lowered, means for closing said door upon raising of said platform, a weighted latch pivoted beneath said door to hold the same in closed position, an egg chute below the egg aperture, and a weighted trip lever engaging said latch and projecting into said egg chute to be depressed by an egg when deposited, thereby to release said latch.

3. In a trap nest, in combination, a vertically movable nest platform having an egg aperture therein, an entrance door adapted to be closed by the lowering of said platform, an exit door hinged upon a horizontal axis and weighted above said axis whereby said exit door normally tends to remain open, a latch holding said exit door closed, and operable by a deposited egg to release said door, a link pivoted at one end to said platform, the other end having a slot therein, a lever arm fixedly secured to said exit door and projecting into the slot of the link, whereby the exit door is closed upon raising said platform.

4. In a trap nest, in combination, a vertically movable nest platform having an egg aperture therein, an entrance door adapted to be closed and opened by the lowering or raising of said platform, respectively, a weighted exit door hinged upon a horizontal axis and normally tending to swing open, a latch holding said exit door closed and operable by a deposited egg to release said door, a link pivoted at one end to said platform, the other end having a slot therein, a lever arm fixedly secured to said exit door and having its outer end movable in said slot, whereby the exit door is unaffected by lowering of the platform, but is closed by the raising thereof.

Signed at Seattle, King County, Washington, this 27 day of September, 1920.

CHARLES J. WILLIAMS.